United States Patent [19]  [11]  4,343,926
Caumartin et al.  [45]  Aug. 10, 1982

[54] FLUIDIZED BED TERPOLYMERIZATION OF ETHYLENE, PROPYLENE AND NON-CONJUGATED DIENE

[75] Inventors: François Caumartin; Jean L. Vidal; Pierre Mangin, all of Martigues, France

[73] Assignee: NAOHTACHIMIE Societe Anonyme, Courbevoie, France

[21] Appl. No.: 165,359

[22] Filed: Jul. 2, 1980

[30] Foreign Application Priority Data

Jul. 6, 1979 [FR] France ................. 79 17547

[51] Int. Cl.³ .............................................. C08F 2/34
[52] U.S. Cl. ..................................... 526/68; 526/142; 526/282; 526/336; 526/901
[58] Field of Search .................. 526/142, 901, 68

[56] References Cited

U.S. PATENT DOCUMENTS 3,152,106 10/1964 Mostert .......................... 526/901
3,925,338 12/1975 Ort .................................. 526/142
4,082,692 4/1978 Goldie ............................. 526/142
4,110,248 8/1978 Sandis et al. .................... 526/142
4,199,474 4/1980 Sandis et al. .................... 526/142
4,255,542 3/1981 Brown et al. ..................... 526/68

FOREIGN PATENT DOCUMENTS 1055404 1/1967 United Kingdom .
1367775 9/1974 United Kingdom .

*Primary Examiner*—Stanford M. Levin
*Attorney, Agent, or Firm*—McDougall, Hersh & Scott

[57] ABSTRACT

The invention concerns a process for the production of elastomeric terpolymers of ethylene, propylene and dienes by the direct polymerization of the monomeric olefins in the gaseous state, in contact with a catalytic system comprising one or more solid compounds of titanium. The resulting terpolymers which are produced in the form of powders can be used without intermediate transformation for the production of molded or extruded articles.

10 Claims, No Drawings

FLUIDIZED BED TERPOLYMERIZATION OF ETHYLENE, PROPYLENE AND NON-CONJUGATED DIENE

The invention concerns the preparation of elastomeric terpolymers of ethylene, propylene and dienes, by a process wherein the monomeric olefins are directly polymerized in the gaseous state, in contact with a catalytic system comprising one or more solid compounds of titanium. The resulting terpolymers are produced in the form of powders which can be used without an intermediate transformation operation, for the production of molded or extruded articles.

It is known to prepare terpolymers of ethylene, propylene and dienes such as 5-ethylidene-2-norbornene, within a liquid hydrocarbon containing a catalytic system comprising a vanadium compound. Polymerization results in the formation of a terpolymer which is dissolved in the liquid hydrocarbon. The terpolymer is precipitated by water or water vapour, in the form of coagulated particles, while the catalytic residues remain dissolved in the water. The particles of the terpolymer are isolated and then dried; however, the separation operation is difficult to carry out, by virtue of the rubbery nature of the terpolymer. With this method, it is also necessary to separate the liquid hydrocarbon from the aqueous suspension, in order to recycle it.

It is an object of this invention to provide a process for the production of terpolymers of ethylene, propylene and dienes, with non-conjugated double bonds, which does not suffer from the above-indicated disadvantages.

The present invention concerns the production of elastomeric terpolymers of ethylene, propylene and a diene containing by weight 25–80% propylene units and from 0.5 to 5% by weight of the diene units, by a process characterized in that a gaseous mixture of ethylene, propylene and the diene is brought into contact, in the absence of liquid hydrocarbon, with a catalytic system comprising one or more solid compounds of titanium and one or more organo-metallic compounds of metals of groups II and III of the periodic table of elements.

The catalytic systems which can be used in the production of the terpolymers of the invention are selected from systems which are capable of polymerizing ethylene and propylene at similar speeds. These kinetic properties of the catalytic system, concerning the relative speeds of polymerization of ethylene and propylene, are evaluated, in the production of a terpolymer of ethylene and propylene, by comparing the composition, in respect of monomers, of the polymerization medium and the composition of the terpolymer produced; the catalytic systems used are preferably so selected that the composition of the terpolymer is close to that of the mixture of monomers. It has also surprisingly been found that, without disadvantage, that catalytic systems used could be highly stereospecific in the polymerization of propylene alone, the degree of stereospecificity being measured by the proportion of polypropylene produced, which is insoluble in boiling n-heptane; the above-mentioned proportion may reach 95% and more in the case of catalytic systems which are highly stereospecific.

The dienes which are suitable for use in the production of the terpolymers of the invention preferably comprise aliphatic or alicyclic dienes with non-conjugated double bonds such as hexa-1,4-diene or 5-ethylidene-2-norbornene.

Preferably, the terpolymers which are produced in accordance with the invention contain from 33 to 66% by weight of units derived from propylene and from 1 to 4% by weight of units derived from the diene.

The solid titanium compounds which form components of the catalytic system are preferably produced by the reduction of titanium tetrachloride by means of an organo-aluminum compound, at a temperature of from $-10°$ to $80°$ C., and then by heating of the resulting precipitate, in the presence of an excess of titanium tetrachloride, at a temperature which can be up to $115°$ C., these operations being performed in the presence of an electron donor compound or being associated with a treatment by an electron donor compound, such as an aliphatic ether of the formula $R'\text{—}O\text{—}R''$ wherein $R'$ and $R''$ are alkyl groups containing from 2 to 5 carbon atoms. Such titanium compounds can in particular be prepared in accordance with the information disclosed in the Sandis et al. U.S. Pat. No. 4,110,248, issued Aug. 29, 1978 and the Sandis et al. U.S. Pat. No. 4,199,474, issued Apr. 27, 1980, by the reduction of titanium tetrachloride by means of an organo-aluminum compound and then by heating of the resulting precipitate, the number of moles of titanium tetrachloride used being in excess of at least 20% with respect to the number of organic radicals of the organo-aluminum compound and the preparation operation being performed in the presence, as the electron donor compound, of from 2 to 5 moles of an aliphatic ether as defined above, per mole of organo-aluminum compound.

The organo-metallic compounds of a metal of groups II and III of the periodic table preferably comprise organo-aluminum compounds having the mean formula $AlR_xZ_{(3-x)}$ wherein R represents an alkyl group containing from 2 to 12 carbon atoms, Z represents a hydrogen atom or a halogen such as chlorine or bromine and X represents an integer or a fraction which can be of any value from 1 to 3. The organo-metallic compounds are advantageously used in amounts such that the atomic ratio: [metals of groups II and III of the co-catalysts/titanium of the titanium compounds], is from 1 to 50.

The components of the catalytic system can be used in different ways.

The solid titanium compound can be introduced, into the polymerization reaction vessel, in association with a carrier comprising solid granules or in the form of a prepolymer which is produced by means of preliminary polymerization of ethylene alone, propylene alone or a mixture of ethylene and propylene and possibly a diene, in the presence or in the absence of a liquid diluent and in the presence of a catalytic system as defined above. For producing the prepolymer, it is sufficient to polymerize from 20 to 5000 moles of olefin per gram-atom of titanium of the catalytic system; accordingly, the amounts of pre-polymer used remain low with respect to the amounts of the terpolymer which is finally produced and consequently have little influence on the properties thereof. The pre-polymer in which the titanium compound remains included can be directly used in accordance with the invention, as the solid titanium compound, if appropriate after separation of the liquid diluent used in the pre-polymerization step; however, before using the pre-polymer in the process of the invention, it may be advantageous for the pre-polymer to be subjected to one or more extraction steps by means of a solvent such as an aliphatic hydrocarbon in order to create porosity within the pre-polymer granules. Such porosity enhances the accessibility of the olefins to the catalyst contained therein.

The organo-metallic compounds of a metal of groups II and III of the periodic table may also be introduced directly into the polymerization reaction vessel. These compounds can also be used in the form of a porous carrier which has previously been impregnated with such compounds, in which case the porous carrier may be formed by solid granules, of organic or inorganic nature, or may comprise a pre-polymer as mentioned in the preceding paragraph.

Polymerization is carried out in the absence of liquid hydrocarbon such as liquid propylene or a saturated liquid hydrocarbon, by direct contact of the monomers in the gaseous state, comprising ethylene, propylene and diene, with solid particles of the terpolymer in the course of formation and with the components of the catalytic system, associated with a solid granular carrier or a pre-polymer. This operation is advantageously carried out in a reaction vessel which is referred to as a 'fluidization reaction vessel', by a rising circulation of the monomers in the gaseous state through a fluidized bed of solid particles of the terpolymer in the course of formation.

Furthermore, polymerization may be effected in the presence of a chain growth limiter, generally hydrogen, which is used in a proportion of from 1 to 20% by volume with respect to the olefins which are present in the polymerization medium, so as to produce a polymer having the required fluidity index.

The upward speed to be imparted to the gaseous mixture in order to maintain the terpolymer present in the reaction vessel, in a fluidized state, is related to the physical parameters of the terpolymer and the gaseous mixture. Of such parameters, the main ones are the size of the terpolymer particles, the specific mass of the terpolymer and the viscosity and the specific mass of the gaseous mixture; upward speeds of the order of some decimeters per second are the speeds most generally employed.

The temperature in the reaction vessel is maintained at a sufficient level for rapid polymerization, without however being too close to the temperature at which agglomerates are formed which would interfere with or stop polymerization. The temperature may be from $-40°$ to $90°$ C. and is preferably from $50°$ to $80°$ C.

The composition of the gaseous mixture circulating in the polymerization reaction vessel is selected in accordance with the proportions of units resulting from ethylene, propylene and diene, which are desired for the terpolymer. The total pressure in the reaction vessel is generally lower than 40 bars.

The gaseous mixture is in contact with the catalytic system in the reaction vessel, only for a limited period of time which is generally less than some tens of seconds. Accordingly, only a fraction of the olefins introduced into the reaction vessel is polymerized therein and it is consequently necessary for the gaseous mixture which issues from the reaction vessel to be recycled thereto, with a make-up of olefins to be polymerized. In order to ensure that the gaseous mixture does not entrain particles of the polymer or the catalyst to the outlet of the reaction vessel, the reaction vessel may for example be provided in its upper part with a chamber which is referred to as a tranquillisation chamber and which is larger in section than the reaction vessel. In the tranquillisation chamber, the speed of rise of the gaseous mixture is lower than in the reaction vessel, which permits at least a fraction of the polymer or catalyst particles entrained with the mixture to fall back into the reaction vessel. The particles which are entrained by the gaseous mixture can also be separated in a cyclone separator and returned to the reaction vessel, preferably in the lower part thereof. As polymerization of the olefins causes heat to be given off, it is necessary to remove the heat produced in order to maintain a constant temperature in the reaction vessel; the heat removal operation is preferably effected by circulating the gaseous mixture to be recycled through a heat exchanger disposed outside the reaction vessel.

In order to produce terpolymers which have the abovementioned characteristics, it is preferable for the ratio between the amounts of ethylene, propylene and diene present in the polymerization medium to be maintained at a substantially constant value throughout the polymerization operation. This condition can be achieved by means of an apparatus comprising on the one hand an analyzer for measuring the concentrations in respect of ethylene, propylene and diene in the polymerization reaction vessel, and, on the other hand, means for introducing ethylene, propylene and diene into the reaction vessel, said means being controlled by the analyzer to maintain the desired ratio.

Polymerization of the olefins according to the invention can also be performed in a plurality of fluidized bed reaction vessels which are disposed in series. In this case, only a part of the polymerization operation is performed in each reaction vessel and the terpolymer, in the course of formation, circulates from the head reaction vessel to the tail reaction vessel. In an alternative, certain reaction vessels may be disposed in parallel so that the terpolymer, in the course of formation, coming from a reaction vessel, is used to feed two or more secondary reaction vessels.

The finished terpolymer can be discharged from the reaction vessel in which it is produced, by means of different mechanical or pneumatic devices. One discharge means comprises providing the lower part of the reaction vessel with an orifice which is capable of being closed, in communication with a chamber pressurized to a level lower than that in the reaction vessel. Opening of the orifice for a given period of time permits the desired amount of polymer to be removed from the reaction vessel into the chamber. After the orifice is closed, the chamber can be opened to the outside atmosphere to collect the terpolymer.

The elastomeric terpolymers of the invention can be used, either alone or in mixture with other polymers, in the production of extruded or moulded articles, such as various joints or seals which can be used in the motor vehicle industry and in the building industry. The terpolymers can be cross-linked before or during their conversion into molded or extruded articles, using the usual methods in the rubber industry, for example by means of sulphur associated with an accelerator and zinc oxide.

The elastomeric terpolymers of the invention can also be used for the production of isotactic polypropylene compositions which have high impact strength. Such compositions are conveniently prepared by producing an intimate mixture, at a temperature of from $150°$ to $200°$ C., of up to 70 parts by weight, preferably from 5 to 50 parts by weight, of terpolymer and 100 parts by weight of isotactic polypropylene. Using isotactic polypropylene and terpolymer, in powder or granule form, this operation is conveniently performed in a mixture which produces a shearing effect such as a malaxator, a calender or a single-screw or double-screw extruder. This operation can be carried out in one or more passes and it can also be preceded by a simple mixing step. In the course of operation, additives such as conventional stabilizing agents can be added to the mixture. The isotactic polypropylene compositions which are produced in this way can be used in particular in the motor vehicle industry for producing components such as bumpers.

The process of the invention is remarkable from several points of view. Indeed, it makes it possible directly to produce elastomeric terpolymers of ethylene, propylene and diene in the form of powders, without the necessity, as in the prior art, to effect a laborious separation operation for separating the terpolymer and the liquid hydrocarbon in which it was formed. Moreover, the fact that the terpolymer is produced in the form of a powder comprising granules of a uniform size, of the order of from 0.2 to 1 mm in diameter, is an appreciable advantage because the mixture of the terpolymer with the usual ingredients of the rubber industry or with isotactic polypropylene is easy to produce. In contrast, the terpolymers which are produced in accordance with the prior art are available commercially in the form of rubbery materials which have to be milled; accordingly, the mixture of such terpolymers is more difficult to produce and in the end gives less good results. Finally, it is remarkable that catalytic systems which are stereospecific with respect to the propylene can be used in the process of the invention, while permitting elastomeric terpolymers of ethylene, propylene and dienes to be easily produced; indeed, it might have been thought that catalytic systems which are stereospecific with respect to propylene and which result in the formation of crystalline polypropylene would not be suitable for the production of elastomeric terpolymers.

EXAMPLE 1

(1-a) Preparation of a catalytic titanium compound 380 g (2 moles) of titanium tetrachloride, 120 ml of anhydrous n-heptane and 27 g (170 mmoles) of diisoamyl ether are introduced into a 1 liter stainless steel reaction vessel. The mixture is heated at a temperature of 35° C. and with agitation, and a mixture of 30 g (250 mmoles) of diethyl aluminum chloride and 70 g (440 mmoles) of diisoamyl ether dissolved in 180 ml of n-heptane is introduced at a regular flow rate in 4 hours.

The precipitate formed is maintained in an agitated condition for 1 hour at 35° C. and then for 2 hours at 65° C. The solid titanium compound is then washed five times by mixing with 500 ml of n-heptane at 65° C., and decantation. It is preserved in n-heptane, being protected from air and moisture.

(1-b) Preparation of a pre-polymer from propylene 3.4 g (28 mmoles) of diethyl aluminium chloride in molar solution in n-heptane and an amount of the suspension of the titanium chloride prepared in (1a) above corresponding to 7.1 milligram-atoms of titanium are introduced into a 5 liter reaction vessel containing 2 liters of anhydrous n-heptane at a temperature of 60° C.

With the medium being maintained at a temperature of 60° C., and in an agitated state, propylene is introduced at a constant rate of 160 g/h for a period of 3 hours 10 minutes. To the suspension of prepolymer which is formed, the suspension being cooled to ambient temperature, there is added 10.4 g (28.4 mmoles) of tri-n-octyl aluminum in solution in n-heptane, under vacuum. This produces 500 g of a fluid powder of prepolymer which is of a rose-violet colour and which is preserved in nitrogen, protected from air and moisture.

(1-c) Preparation of a terpolymer

Operation is carried out in a fluidized bed reaction vessel which is 15 cm in diameter and which is provided with an adjoining container under pressure in which the prepolymer is stored and another container into which the polymer formed is discharged.

The fluidization gas issuing from the reaction vessel is partially cooled in an exchanger and then recycled to the reaction vessel by means of a blower; it is composed of a mixture of ethylene, propylene and diene, at a pressure of 20 bars. The composition and pressure of the gases are kept at constant values by the addition of monomers in amounts equal to the amounts consumed during the polymerization operation, the latter being determined by chromatographic analysis. The ethylene and propylene are introduced continuously in the gaseous state, into the recycling circuit. The diene is introduced into the reaction vessel directly every 10 minutes, in the liquid state; upon contact with the fluidized bed, it undergoes instantaneous vaporization.

The nature and the proportion of the monomers and the temperature of the polymerization step are set forth in Table I, while the properties of the terpolymer produced are set forth in Table II.

The temperature of the fluidized bed is maintained at a constant level by controlling the temperature of the incoming gas.

The reaction vessel is supplied by the periodic introduction of small amounts of pre-polymer; a fraction of the terpolymer produced, corresponding to the production, is taken from the reaction vessel, for example every 10 minutes, so as to maintain the bed at a substantially constant height.

The proportion by weight in the terpolymer of units derived from propylene is measured by infra-red spectrophotometry, at the wave numbers of 720 cm$^{-1}$ and 1150 cm$^{-1}$, on a sheet of the molten copolymer at about 200° C. This method is derived from that described by Th. Gössl (in Die Makromolecular Chemie XLII-1-10-1960, page 1).

The proportion by weight of units derived from diene is also measured by infra-red spectrophotometry, at the wave numbers corresponding to absorption of the residual unsaturation of the diene in question, using the method described by C Tosi and F Ciampelli (in Advances in Polymer Science, Volume 12, 1973 page 121).

The consistency of the terpolymer is evaluated by means of a Mooney viscosimeter, according to the reaction which is opposed by the terpolymer to continuous shearing at constant speed, under the conditions set forth in the standard ASTM D-1642-72.

EXAMPLES 2 TO 6

Operation is in the same manner as in Example 1, under the conditions set forth in Table I, with the results obtained being set forth in Table II.

The prepolymer used in Example 3 is prepared from ethylene, under the following conditions:

3.4 g (28.4 mmoles) of diethylaluminum chloride in molar solution in n-heptane and an amount of the suspension of the catalyst prepared in (1-a) above, corresponding to 7.1 milligram-atoms of titanium, are introduced into a 5 liter reaction vessel containing 2 liters of anhydrous n-heptane at a temperature of 70° C. With the medium being maintained at a temperature of 60° C., and in an agitated condition, hydrogen is introduced until there is a partial pressure of 6 bars, and then ethylene is introduced at a constant rate of 160 g/h for a period of 3 hours 10 minutes. To the suspension of prepolymer which is formed, the suspension being cooled to ambient temperature, there is added 10.4 g (28.4 mmoles) of tri-n-octylaluminum in solution in n-heptane, under vacuum. This results in 480 g of a fluid pre-polymer powder, which is rose-violet in colour and which is preserved in nitrogen, protected from air and humidity.

TABLE I

| EXAMPLE | Temperature (°C.) | Production of the terpolymers | | | Production of terpolymer (g/h) |
|---|---|---|---|---|---|
| | | Composition of the gaseous mixture (% by volume) | | | |
| | | Propylene | Ethylene | Diene | |
| 1* | 60 | 40 | 58 | EMB 2 | 268 |
| 2* | 60 | 40 | 58 | EMB 2 | 200 |
| 3** | 60 | 40 | 58 | EMB 2 | 300 |
| 4* | 70 | 44 | 53 | HXD 3 | 425 |
| 5* | 70 | 41 | 56 | HXD 3 | 250 |
| 6* | 70 | 41 | 55 | HXD 4 | 225 |

*Polypropylene pre-polymer
**Polyethylene pre-polymer
EMB = 5-ethylidene-2-norbornene
HXD = hexa-1,4-diene

TABLE II

| EXAMPLE | Characteristics of the terpolymers | | | |
|---|---|---|---|---|
| | Mean granulometry (microns) | Proportion of propylene (% by weight) | Proportion of diene (% by weight) | Mooney viscosity at 100° C. |
| 1 | 370 | 40 | 0.8 | 70 |
| 2 | 395 | 38 | 1 | 65 |
| 3 | 340 | 30 | 1.1 | 85 |
| 4 | 550 | 34 | 1.2 | 85 |
| 5 | 460 | 35 | 1.5 | 85 |
| 6 | 445 | 35.5 | 1.9 | 80 |

We claim:

1. A process for the production of elastomeric terpolymers of ethylene, propylene and a non-conjugated diene wherein the proportions by weight of units derived from propylene and units derived from diene are respectively from 25 to 80% and from 0.5 to 5%, the process being characterized as a continuous process in that a gaseous mixture of ethylene, propylene and the diene is brought momentarily into contact in a dry fluidized state, in the absence of liquid hydrocarbon, with a catalytic system comprising one or more solid compounds of titanium produced by the reduction of titanium tetrachloride by means of an organo-aluminum compound at a temperature of from −10° to 80° C. and then by heating of the resulting precipitate, in the presence of an excess of titanium tetrachloride at a temperature up to 115° C., both steps being carried out in the presence of an electron donor compound, one or more organo-metallic compounds of the mean formula $AlR_xZ_{(3-x)}$, wherein R represents an alkyl group containing from 2 to 12 carbon atoms, Z represents a hydrogen atom or a halogen and X represents an integer or a fraction which can be of any value of from 1 to 3, recycling the unreacted gaseous monomers after removal of entrained solid particles, adding fresh monomer to the recycled unreacted monomers, in an amount to maintain relatively constant the ratio of the monomers brought into contact with the catalyst, and which includes the step of introducing a prepolymer for fluidization with the monomer, in which the prepolymer contains the catalyst.

2. A process as claimed in claim 1 wherein the solid titanium compound is prepared in the presence of an excess of titanium tetrachloride of at least 20% with respect to the number of organic radicals of the organo-aluminum compound and in the presence of from 2 to 5 moles of aliphatic ether per mole of organo-aluminum compound.

3. A process as claimed in claim 1 which includes the step of introducing a prepolymer for fluidization with the monomers, in which the prepolymer contains the catalyst and is produced by preliminary polymerization, in the presence or in the absence of a liquid diluent, of from 20 to 5000 moles of monomer selected from the group consisting of ethylene, propylene, a mixture of ethylene and propylene, and mixtures thereof with a diene.

4. A process as claimed in claim 1 which is performed by direct contact of the ethylene, propylene and diene in the gaseous state, with particles of terpolymer in the course of formation and with the components of the catalytic system, associated with a granular carrier in a fluidization reaction vessel wherein the particles of terpolymer in the course of formation and those containing the catalytic system are maintained in the fluidized state by a rising flow of the monomers in the gaseous state.

5. A process as claimed in claim 1 which is carried out under a pressure of less than 40 bars and at a temperature of from 40° to 90° C.

6. A process as claimed in claim 1 wherein the diene used is an aliphatic or alicyclic diene with non-conjugated double bonds.

7. A process as claimed in claim 1 in which the electron donor compound is an aliphatic ether having the general formula R'—O—R" in which R' and R" are $C_2$-$C_5$ alkyl groups.

8. A process as claimed in claim 1 in which the halogen is chlorine or bromine.

9. A process as claimed in claim 4 in which the granular carrier is a pre-polymer.

10. A process as claimed in claim 6 in which the diene is 1,4-hexadiene or 5-ethylidene-2-norbornene.

* * * * *